US012500677B2

(12) United States Patent
John Wilson et al.

(10) Patent No.: US 12,500,677 B2
(45) Date of Patent: Dec. 16, 2025

(54) DYNAMIC SEARCH SPACE CONFIGURATION

(71) Applicant: QUALCOMM Incorporated, San Diego, CA (US)

(72) Inventors: Makesh Pravin John Wilson, San Diego, CA (US); Tao Luo, San Diego, CA (US); Xiaoxia Zhang, San Diego, CA (US); Tianyang Bai, Bridgewater, NJ (US); Kiran Venugopal, Raritan, NJ (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 377 days.

(21) Appl. No.: 16/373,546

(22) Filed: Apr. 2, 2019

(65) Prior Publication Data
US 2019/0356399 A1    Nov. 21, 2019

Related U.S. Application Data

(60) Provisional application No. 62/674,451, filed on May 21, 2018.

(51) Int. Cl.
H04B 17/30    (2015.01)
H04B 7/06     (2006.01)
(Continued)

(52) U.S. Cl.
CPC ........... *H04B 17/30* (2015.01); *H04B 7/0619* (2013.01); *H04B 7/06952* (2023.05);
(Continued)

(58) Field of Classification Search
CPC .... H04B 17/30; H04B 7/0619; H04B 7/0695; H04J 11/0079; H04W 24/10; H04W 72/0406; H04W 72/046; H04W 72/20
(Continued)

(56) References Cited

U.S. PATENT DOCUMENTS 10,547,418 B2    1/2020   Ryu et al.
2010/0284356 A1  11/2010  Ray et al.
(Continued)

FOREIGN PATENT DOCUMENTS

CN    106576253 A    4/2017
CN    106797300 A    5/2017
(Continued)

OTHER PUBLICATIONS

International Search Report and Written Opinion—PCT/US2019/025669—ISA/EPO—Jul. 9, 2019.
(Continued)

Primary Examiner — Xuan Lu
(74) Attorney, Agent, or Firm — ArentFox Schiff LLP

(57) ABSTRACT

The present disclosure relates to transmitting and receiving improved monitoring reports. A base station can configure a user equipment (UE) to monitor a channel/signal on multiple beams. The base station can transmit the multiple beams to the UE, which are at different time periods in a monitoring window. The UE can then monitor the multiple beams within the monitoring window and determine a monitoring report. The UE can then transmit the monitoring report to the base station, wherein the monitoring report indicates a subset of multiple beams as being more or less suitable for communication. The base station can also indicate that it will stop transmitting one or more beams and then stop transmitting the beams. If the UE does not send the report, the base station can continue to transmit the multiple beams.

12 Claims, 15 Drawing Sheets

(51) Int. Cl.
*H04J 11/00* (2006.01)
*H04W 24/10* (2009.01)
*H04W 72/044* (2023.01)
*H04W 72/20* (2023.01)

(52) U.S. Cl.
CPC ......... *H04J 11/0079* (2013.01); *H04W 24/10* (2013.01); *H04W 72/046* (2013.01); *H04W 72/20* (2023.01)

(58) Field of Classification Search
USPC .......................................................... 370/252
See application file for complete search history.

(56) References Cited

U.S. PATENT DOCUMENTS

| | | | |
|---|---|---|---|
| 2016/0080060 A1 | 3/2016 | Yu et al. | |
| 2016/0262140 A1* | 9/2016 | Liu | H04W 72/0406 |
| 2017/0251518 A1* | 8/2017 | Agiwal | H04W 76/28 |
| 2017/0331577 A1* | 11/2017 | Parkvall | H04B 7/0452 |
| 2018/0109302 A1 | 4/2018 | Nagaraja et al. | |
| 2018/0278310 A1* | 9/2018 | Lee | H04B 7/0632 |
| 2018/0302889 A1* | 10/2018 | Guo | H04L 5/0053 |
| 2019/0081688 A1* | 3/2019 | Deenoo | H04L 5/0033 |
| 2020/0036430 A1* | 1/2020 | Kim | H04W 72/0413 |
| 2020/0389847 A1* | 12/2020 | Deng | H04J 11/0086 |
| 2021/0368541 A1* | 11/2021 | Hedayat | H04W 74/0816 |

FOREIGN PATENT DOCUMENTS

| | | | |
|---|---|---|---|
| CN | 107889130 A | 4/2018 | |
| EP | 3509340 B1 * | 7/2020 | .......... H04B 7/0695 |
| WO | 2010129822 A1 | 11/2010 | |
| WO | 2015191200 | 12/2015 | |
| WO | 2018059487 A1 | 4/2018 | |

OTHER PUBLICATIONS

Taiwan Search Report—TW108112096—TIPO—Apr. 8, 2022.
Taiwan Search Report—108112096—TIPO—Sep. 26, 2022.

* cited by examiner

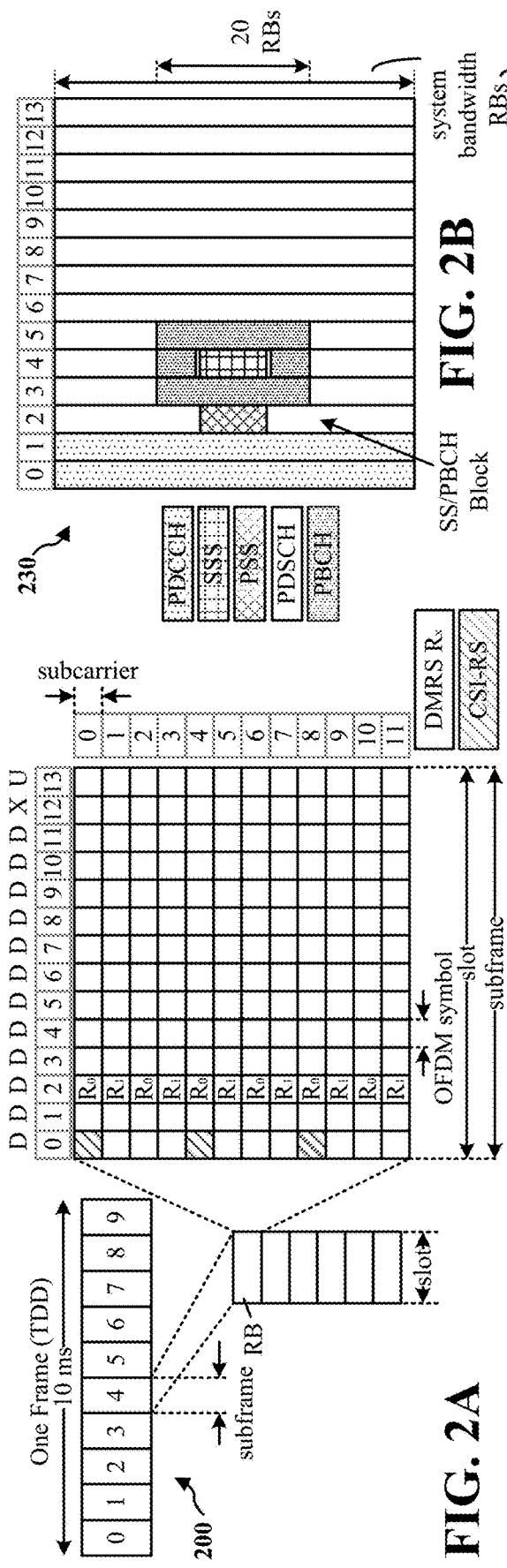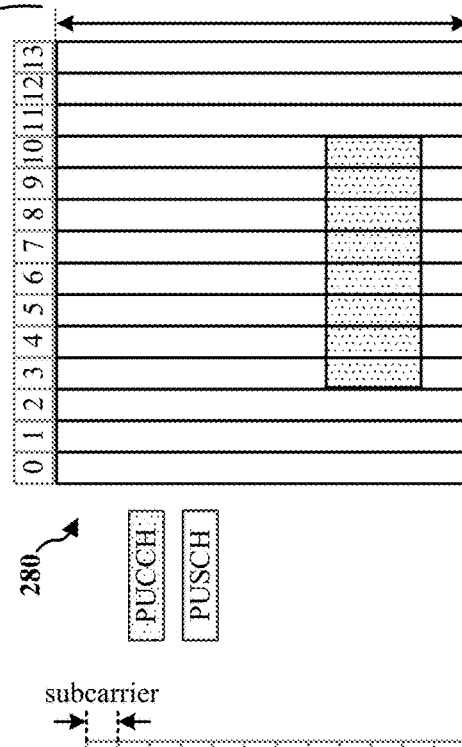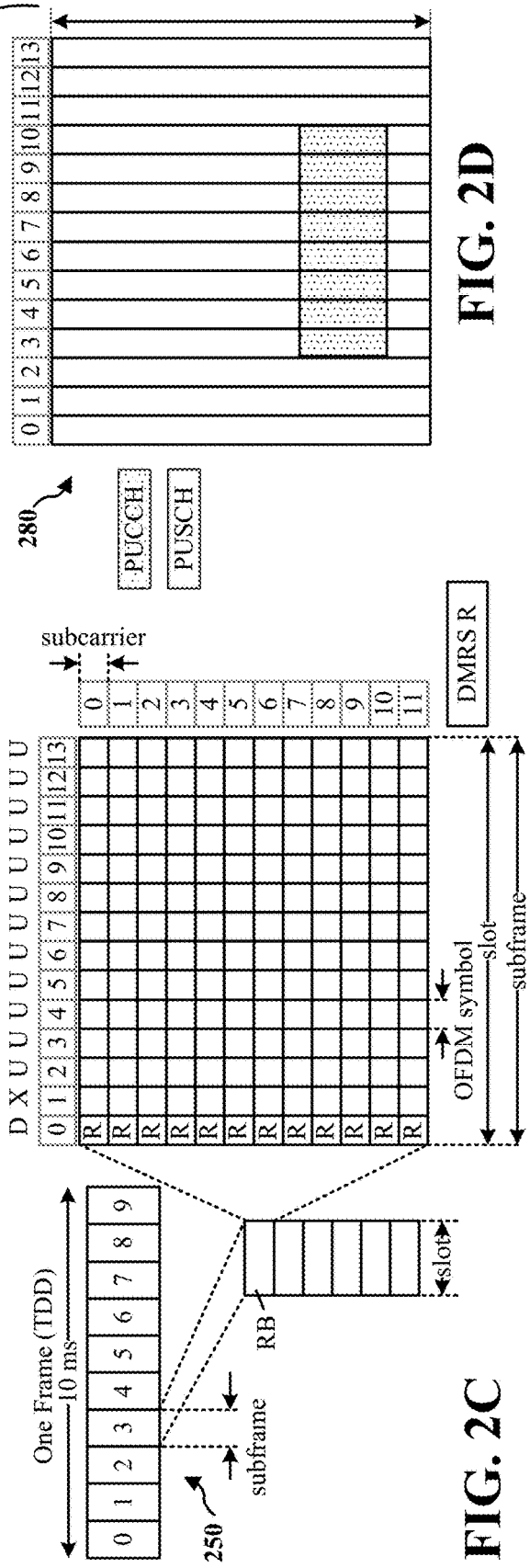

DYNAMIC SEARCH SPACE CONFIGURATION

CROSS REFERENCE TO RELATED APPLICATION(S)

This application claims the benefit of U.S. Provisional Application Ser. No. 62/674,451, entitled "DYNAMIC SEARCH SPACE CONFIGURATION" and filed on May 21, 2018, which is expressly incorporated by reference herein in its entirety.

BACKGROUND

Technical Field

The present disclosure relates generally to communication systems, and more particularly, to methods and devices for transmitting and/or receiving improved signals over multiple beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, base stations and UEs can transmit and/or receive a plurality of beams in order to facilitate communication between each other. These beams can comprise one or more channels or signals that can comprise information. For example, the signals can be sounding reference signals (SRS) and the channels can be on the downlink, e.g. physical downlink shared channel (PDSCH) or physical downlink control channel (PDCCH), or the uplink, e.g. physical uplink shared channel (PUSCH) or physical uplink control channel (PUCCH) In some instances, these channels or signals can comprise a Control Resource Set (CORESET), which is associated with different core resource parameters. The base station may configure the UE to monitor and receive the signals or channels from different beams at different time and frequency locations within a monitoring window. In some aspects, the UE can transmit a monitoring report to the base station that indicates a subset of beams as being more or less suitable for communication. The base station can in turn refrain from transmitting one or more of the multiple beams. By doing so, the overall power consumption and resource utilization can be improved.

The present disclosure enables transmission and receipt of improved monitoring reports between a UE and a base station. A base station can configure a UE to monitor a channel or signal on two or more beams. The UE can receive the configuration for monitoring the channel or signal on the multiple beams. The channel or signal can comprise a Control Resource Set (CORESET). The base station can then transmit the multiple beams to the UE, which can be transmitted at different time periods within a monitoring window. The beams can also be sent at different frequency periods in the monitoring window.

The UE can then monitor the multiple beams within the monitoring window. In one aspect, the UE can monitor each of the multiple beams for one or more channels or signals based on the CORESET configuration. In other aspects, multiple, different CORESETs can be configured for each of the two or more beams. Moreover, the configuration for the two or more beams can comprise a search space configuration providing time-domain monitoring for the CORESETs. The UE can also determine a monitoring report based on the two or more beams, wherein the monitoring report can indicate a subset of multiple beams as being more suitable for communication between the UE and base station. In other aspects, the monitoring report can indicate a subset of multiple beams that are less suitable for communication between the UE and base station. The UE can then transmit the monitoring report to the base station. Additionally, the UE can refrain from monitoring at least one of the two or more beams at the end of the monitoring window, which can depend on the subject matter of the monitoring report. The UE can also refrain from monitoring at least one of the beams outside of the monitoring window.

The base station can also indicate to the UE that it will stop transmitting one or more of the multiple beams in response to the monitoring report. This indication can be transmitted from the base station to the UE via direct signaling comprising at least one of downlink control information, radio resource control signaling, and/or a control element. In some aspects, after the UE sends the monitoring report, the base station can stop transmitting one or more beams based on the content of the report. In other aspects, after the UE sends the monitoring report, the base station continue transmitting the multiple beams. And in other aspects, if the UE does not send the monitoring report, the base station can continue to transmit the multiple beams.

In an aspect of the disclosure, a method, a computer-readable medium, and an apparatus are provided for wireless communication at a UE for monitoring beams. The apparatus can receive a configuration for monitoring a channel or signal on two or more beams from a base station. The apparatus can also monitor the two or more beams from the base station in a monitoring window, wherein the channel or signal is received on the two or more beams at different time periods in the monitoring window. The apparatus can determine a monitoring report based on the two or more beams. Moreover, the apparatus can transmit the monitoring report to the base station within the monitoring window. The monitoring report can indicates a subset of the two or more beams as either being less suitable or as being more suitable for communication from the base station to the UE. The monitoring report can also be based on a reception quality of the two or more beams. Additionally, the apparatus can refrain from monitoring at least one of the two or more beams at the end of the monitoring window based on the monitoring report. Further, the apparatus can receive an indication from the base station that it will stop transmitting on at least one of the two or more beams in response to the monitoring report.

In another aspect of the disclosure, a method, a computer-readable medium, and an apparatus are provided for wireless communication at a base station for transmitting beams. The apparatus can configure a UE to monitor a channel or signal on two or more beams. The apparatus can also transmit the channel or signal on the two or more beams to the UE, wherein the channel or signal is transmitted on the two or more beams at different time periods in a monitoring window. The apparatus can receive a monitoring report from the UE based on the two or more beams. The monitoring report can indicate a subset of the two or more beams as being either less suitable or as being more suitable for communication from the base station to the UE. The monitoring report can also be based on a reception quality of the two or more beams. In addition, the apparatus can transmit an indication to the UE that the base station will stop transmitting to the UE on at least one of the two or more beams. The apparatus can also refrain from transmitting the channel or signal to the UE on the at least one of the two or more beams based on the monitoring report received from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
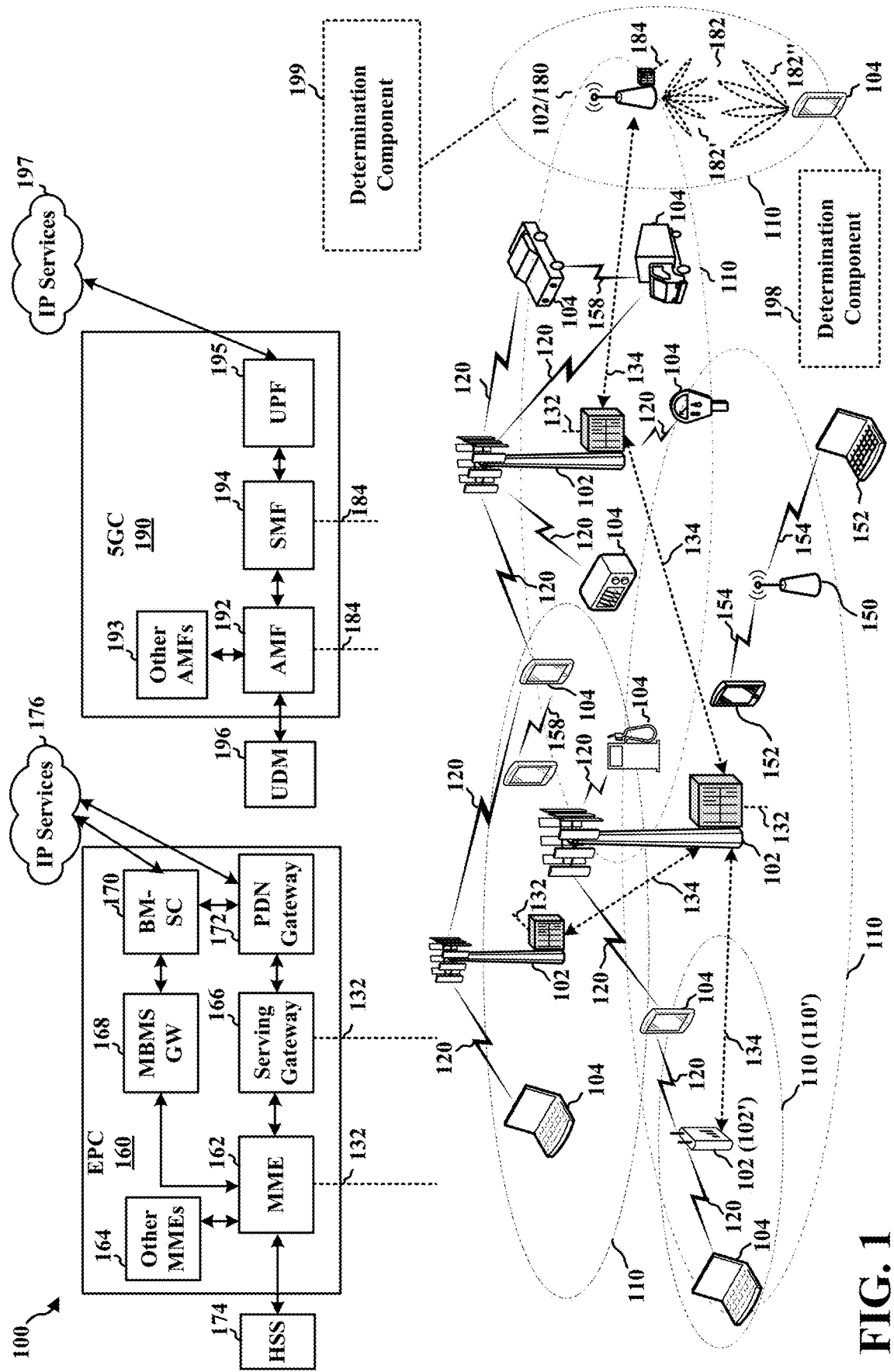
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may include a determination component 198 configured to receive a configuration for monitoring a channel or signal on two or more beams from a base station. The determination component 198 may also be configured to monitor the two or more beams from the base station in a monitoring window, where the channel or signal is received on the two or more beams at different time or frequency periods in the monitoring window. Further, the determination component 198 may be configured to determine a monitoring report based on the two or more beams. The determination component 198 may also be configured to refrain from monitoring at least one of the two or more beams at the end of the monitoring window based on the monitoring report. Additionally, the base station 102/180 may include a determination component 199 that can configure a UE to monitor a channel or signal on two or more beams. The determination component 199 can also be configured to transmit the channel or signal on the two or more beams to the UE, where the channel or signal is transmitted on the two or more beams at different time or frequency periods in a monitoring window. Moreover, the determination component 199 can be configured to receive a monitoring report from the UE based on the two or more beams. The determination component 199 can also be configured to refrain from transmitting the channel or signal to the UE on at least one of the two or more beams based on the monitoring report received from the UE.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
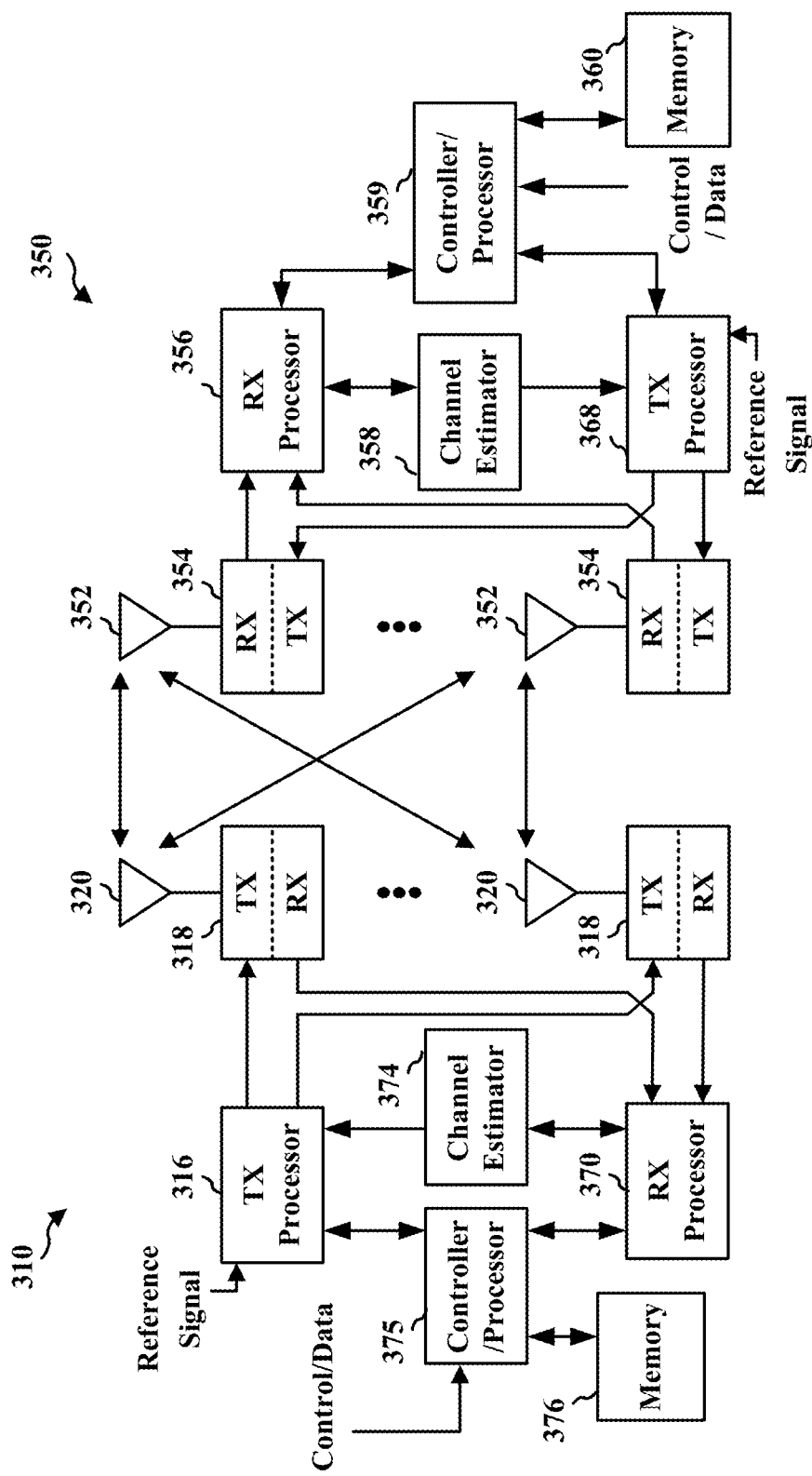
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
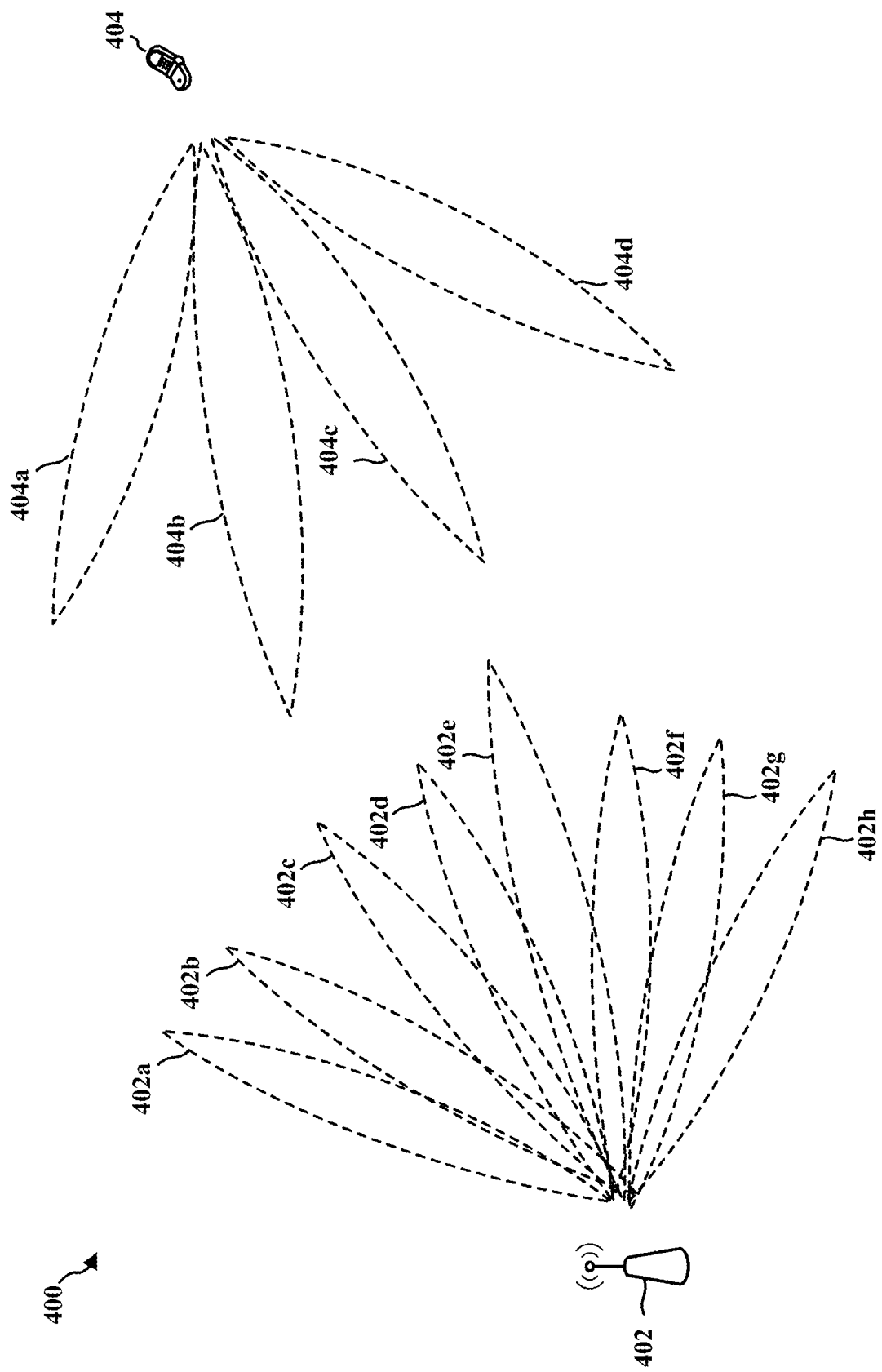
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Wireless communications between base station and UEs can comprise a plurality of beams. For instance, a base station and UE can transmit and/or receive multiple beams in order to facilitate communication between one another. These beams can comprise one or more channels or signals that can comprise information to facilitate the communications. The various signals and channels can either be sent on the downlink, the uplink, or both. In one aspect, the signals can be sounding reference signals (SRS). In addition, the downlink channels can be a PDSCH or a PDCCH. Likewise, the uplink channels can be a PUSCH or a PUCCH. In some instances, these channels or signals can comprise a CORESET.

In some wireless communications, there can be multiple CORESETs and search space configurations. As described previously, a CORESET can be associated with multiple Control Resource parameters. For example, a CORESET can be associated with resource blocks (RBs), OFDM symbols, locations, or a variety of other parameters. A CORESET can also have associated information via Transmission Configuration Indicator (TCI) states, for example spatial information or other types of information. In addition, there can be three CORESETS for every associated bandwidth part. In some aspects, the CORESET configuration may not have any associated monitoring configuration, for example monitoring information in each slot.

A search space configuration can provide time-domain and/or frequency-domain monitoring configurations of the CORESET. Furthermore, a search space configuration can have a linkage to the CORESET via a CORESET identification (CORESET_ID). Different search space configurations can monitor multiple time slots within the CORESET. In one example, search space configuration '0' can monitor CORESET slots 3, 13, 23, etc.

Some aspects of the present disclosure can enable reception of control resources or data in different modes of operation. For instance, aspects presented herein enable reception of control resources or data in a Connected Mode Discontinuous Reception (CDRX) of operation. It is noted that other aspects of the present disclosure can apply to any other modes of operation. The present disclosure can also provide a number of benefits to wireless communication systems. Aspects of the present disclosure can contribute to improving the robustness of wireless communications. For instance, the present disclosure can aid wireless communication systems to maintain communication, even if one or more signals are blocked. Other aspects of the present disclosure can provide substantial power savings benefits, as well as the ability to efficiently utilize a number of resources. Accordingly, aspects of the present disclosure can assist with the robust reception of control resources and data with power-saving and resource utilization benefits.

In one aspect, a base station can configure a UE to monitor and receive signals or channels from multiple beams. Examples of such signals include SRS, DM-RS, etc. Examples of such channels include a PDSCH or PDCCH. These signals or channels from multiple beams can be transmitted at different time locations in a monitoring window. The multiple beams can also be transmitted at different frequency locations. In some aspects, the base station can ask the UE to monitor sub-channels, channels, or beams at certain time locations in the monitoring window. In other aspects, the base station can ask the UE to monitor sub-channels, channels, or beams at certain frequency locations in the monitoring window. The base station can also ask the UE to monitor sub-channels, channels, or beams outside of the monitoring window. The aforementioned monitoring can be used with certain types of frequencies. For example, the monitoring of the present disclosure can be used with mmW frequencies. However, the monitoring described herein can be used with any number of appropriate frequencies for wireless communications.

Monitoring windows in the present disclosure can comprise different features or characteristics. In some aspects, monitoring windows can comprise certain time lengths or periodicity. For example, some monitoring windows can comprise a length of 256 ms. However, monitoring windows according to the present disclosure can comprise any number of different lengths or periodicities. In some aspects, the monitoring windows according to the present disclosure can provide a power savings benefit.

In one aspect, the UE may determine a monitoring report comprising a subset of beams or channels as suitable for further communication with the base station. In another aspect, the monitoring report can comprise one or more beams or channels that are not suitable for further communication. The UE may then transmit the monitoring report to the base station inside or outside of the monitoring window. Additionally, the UE may determine the monitoring report based on the reception quality of different beams, signals, or channels. However, the monitoring report may be determined based on a number of different factors.

Some examples of signals that can be used in the aforementioned monitoring are CSI-RS or PDCCH/PDSCH demodulation reference signals (DMRS). Some examples of channels that can be used are PDCCH or PDSCH, as well as receiver metrics based on these channels. Based on these received metrics, the UE can decide which beam are less suitable for communication. Alternately, the UE may decide which beams are more suitable for communication. For instance, this determination can be based on the PDCCH or CSI-RS in the monitoring window, as well as based on a Synchronization Signal Block (SSB) transmitted outside the monitoring window. The monitoring report can also be communicated to the base station via an uplink signal or channel. Some examples of channels that can be used on the uplink are PUCCH or PUSCH. Some examples of signals that can be used on the uplink are SRS. For instance, information regarding one or more beams can be conveyed via the SRS resource, e.g. that has QCL information.

Based on the monitoring report, the base station may stop transmitting on one or more beams. The UE may also stop monitoring the signal or channel on the one or more beams within the monitoring window. Accordingly, once the UE transmits the monitoring report, the BS may no longer transmit using a certain one or more beams and the UE may no longer monitor those beams. Because the beams are no longer transmitted and/or monitored, this can reduce the overall power consumption of the wireless communication system. In a sense, the UE goes to sleep regarding a certain beam that is no longer transmitted and/or monitored. The BS also ignores or does not transmit or monitor this beam.

Stopping the transmission or monitoring of one or more beams can also assist with the flexibility in data transmission. Further, stopping the transmission or monitoring of beams can contribute to robustness. Additionally, the base station can configure a UE to monitor two search space blocks or CORESETs. When the UE tells the base station that one search space block or CORESET is preferable or more suitable, then the base station can improve the robustness on that particular search space block.

The base station can also schedule the aforementioned transmissions and monitoring based on the associated parameters of the control resource. For example, once the feedback report based on the monitoring is received from the UE, then the non-transmission of one or more beams can be scheduled by the base station. In another example implementation, the non-transmission indication can be transmitted via direct signaling from the base station to the UE. The indication can comprise at least one of downlink control information (DCI), radio resource control (RRC) signaling, and/or a control element such as MAC-CE.

Figure 5:
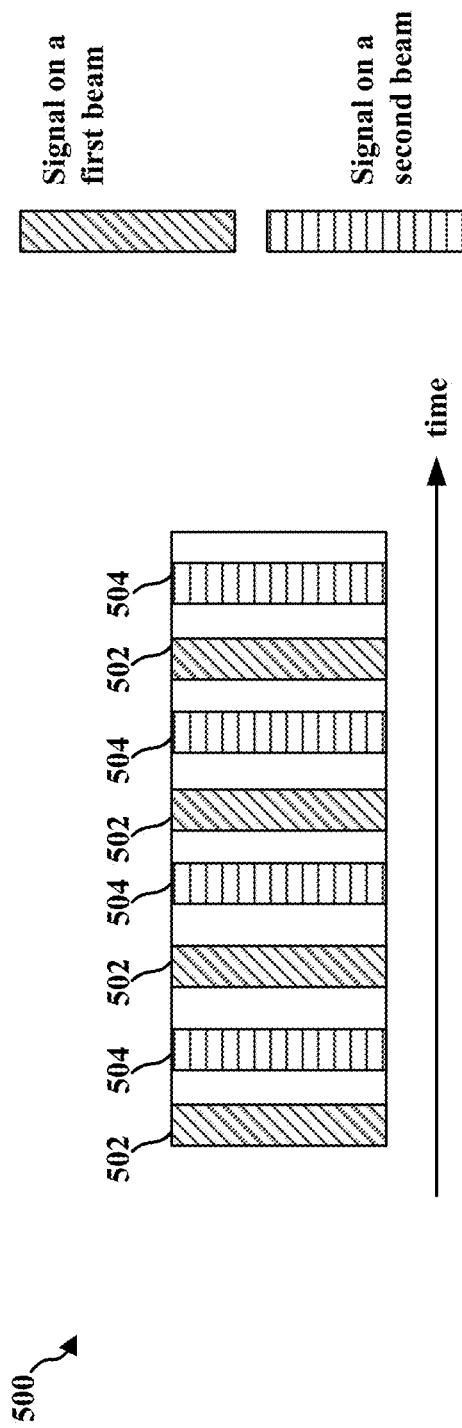
FIG. 5 is a timeline illustrating transmissions between a base station and a UE including multiple beams.

FIGS. 5-8 display different examples of timelines of the aforementioned beam transmission between the base station and UE. For instance, FIG. 5 is a timeline 500 illustrating the transmissions between a base station and a UE including multiple beams. More specifically, FIG. 5 displays two separate beam sets, e.g., 502, 504 being transmitted from a base station to a UE. For example, a first signal 502 may be transmitted on a first beam during a first slot and a second signal 504 may be transmitted on a second beam during a second slot. The first and second may be alternately transmitted, as illustrated This is an example of the transmission of two beams, wherein a monitoring report is not sent to interrupt the transmission of one or more beams. As displayed in FIG. 5, time is along the x-axis, and each beam is transmitted at a different time or frequency location.

Figure 6:
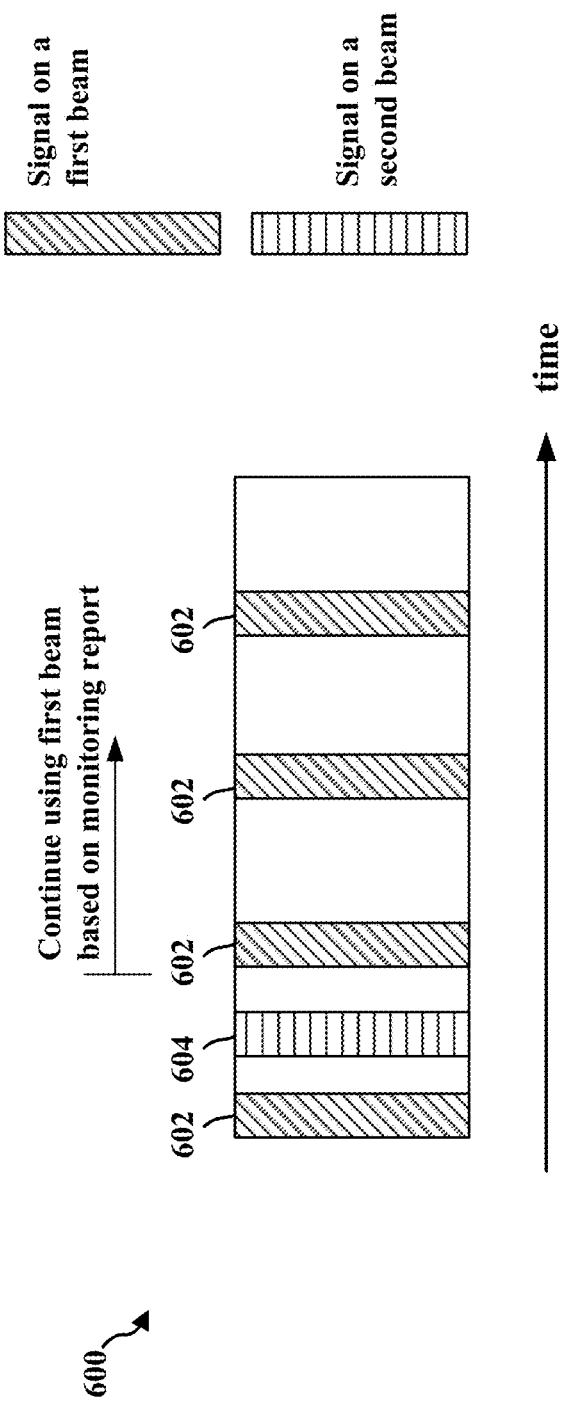
FIG. 6 is a timeline illustrating transmissions between a base station and a UE including multiple beams.

FIG. 6 is a timeline 600 illustrating multiple beam transmissions between a base station and a UE when the aforementioned monitoring is implemented. For example, the base station can send a notification on each of the signals or channels of the multiple beams. This notification from the base station can induce monitoring of the multiple beams by the UE. During the monitoring window, the UE can monitor the two sets of beams, determine a monitoring report based on the beams, and then transmit the monitoring report to the base station. As mentioned previously, the UE can monitor multiple CORESETs of the two beams from the base station.

As displayed in FIG. 6, the base station transmits signals on two sets of beams to the UE, e.g., a first signal 602 may be transmitted on a first beam during a first slot and a second signal 604 may be transmitted on a second beam during a second slot. The UE monitors the first transmissions for the two different beam sets. Once the UE has sufficiently monitored the different beams 602, 604, the UE can determine a monitoring report based on the two beams. The monitoring report may indicate that beam 604 is less suitable or that beam 602 is preferred. The UE then transmits the monitoring report to the base station. As shown in FIG. 6, the monitoring report from the UE conveys to the base station information that enables the base station to continue to use the first beam and/or drop the second beam. Accordingly, after the initial transmission(s) of both beam sets, the base station only continues to transmit using the first beam. The UE may also refrain from monitoring for a signal over the second beam.

Figure 7:
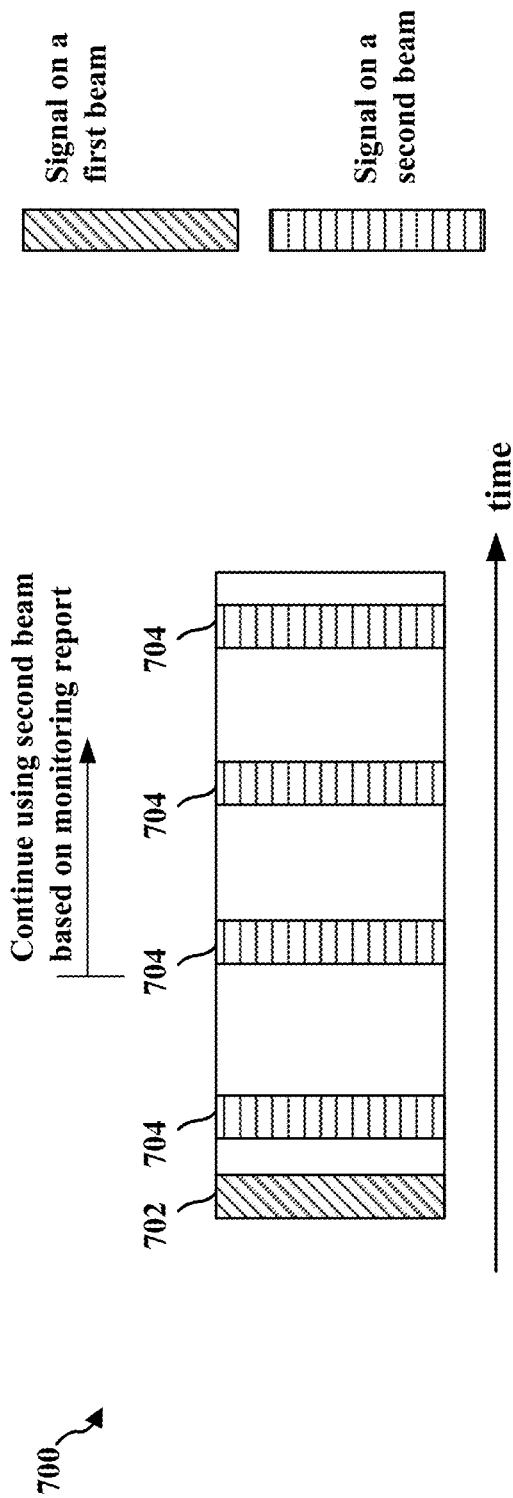
FIG. 7 is a timeline illustrating transmissions between a base station and a UE including multiple beams.

FIG. 7 is a timeline 700 displaying beam set transmission similar to FIG. 6. FIG. 7 displays two separate beam sets, e.g., 702, 704 being transmitted from a base station to a UE. In FIG. 7, only the second beam 704 continues to transmit after the initial beam transmission(s). Accordingly, in the monitoring report according to FIG. 7, the UE conveys to base station information that enables the base station to continue to use the second beam 704 and/or to drop the first beam 702. For example, the UE may indicate that the second beam 704 is more suitable for communication or may indicate that the first beam 702 is less suitable for communication. Thus, the base station may refrain from transmitting using the first beam and may continue to transmit the signal over only the second beam. The UE may also refrain from monitoring for a signal over the first beam.

Figure 8:
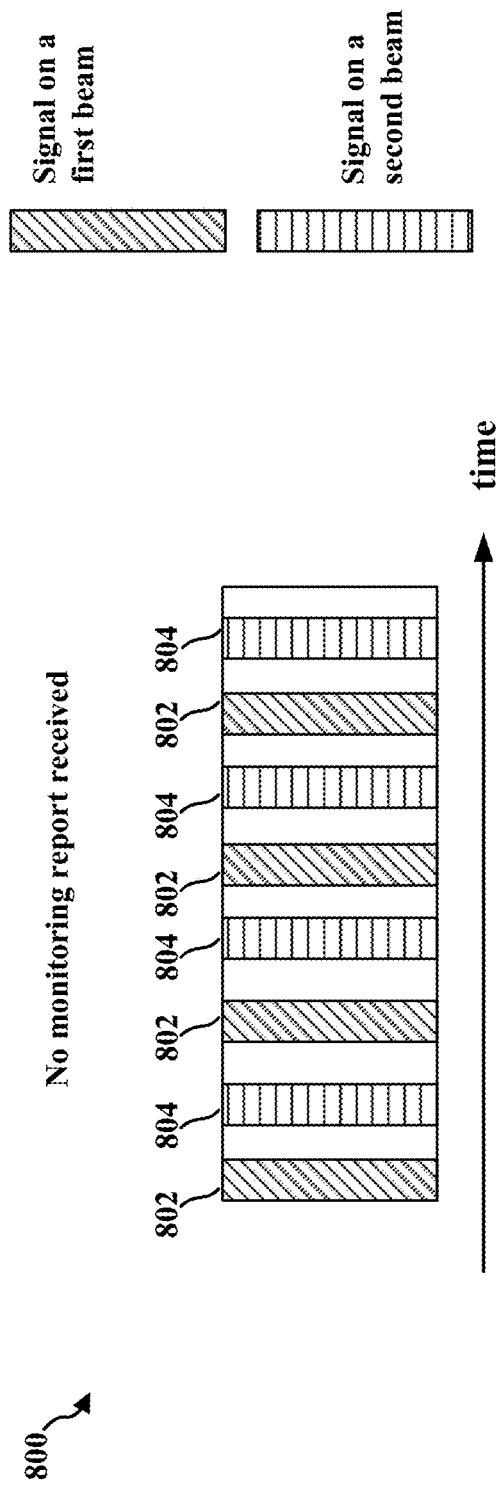
FIG. 8 is a timeline illustrating transmissions between a base station and a UE including multiple beams.

FIG. 8 is also a timeline 800 illustrating transmissions between a base station and a UE including multiple beams in which the UE does not transmit a monitoring report. There may be circumstances in which the UE is not able to or determines not to send a monitoring report. Alternately, the UE may transmit the monitoring report, however, the base station may not receive the monitoring report. FIG. 8 displays two separate beam sets, e.g., 802, 804 being transmitted from a base station to a UE. FIG. 8 may appear similar to FIG. 5, as both sets of beams 802, 804 continue to transmit undisturbed. However, in FIG. 8, the base station and UE perform all the different steps in FIGS. 6 and 7, with the exception of actually transmitting the monitoring report. Indeed, FIG. 8 displays that the UE can still monitor the transmitted beams, but if no report is sent, or if the report is sent but not received, then the base station continues to transmit using both sets of beams.

Figure 9:
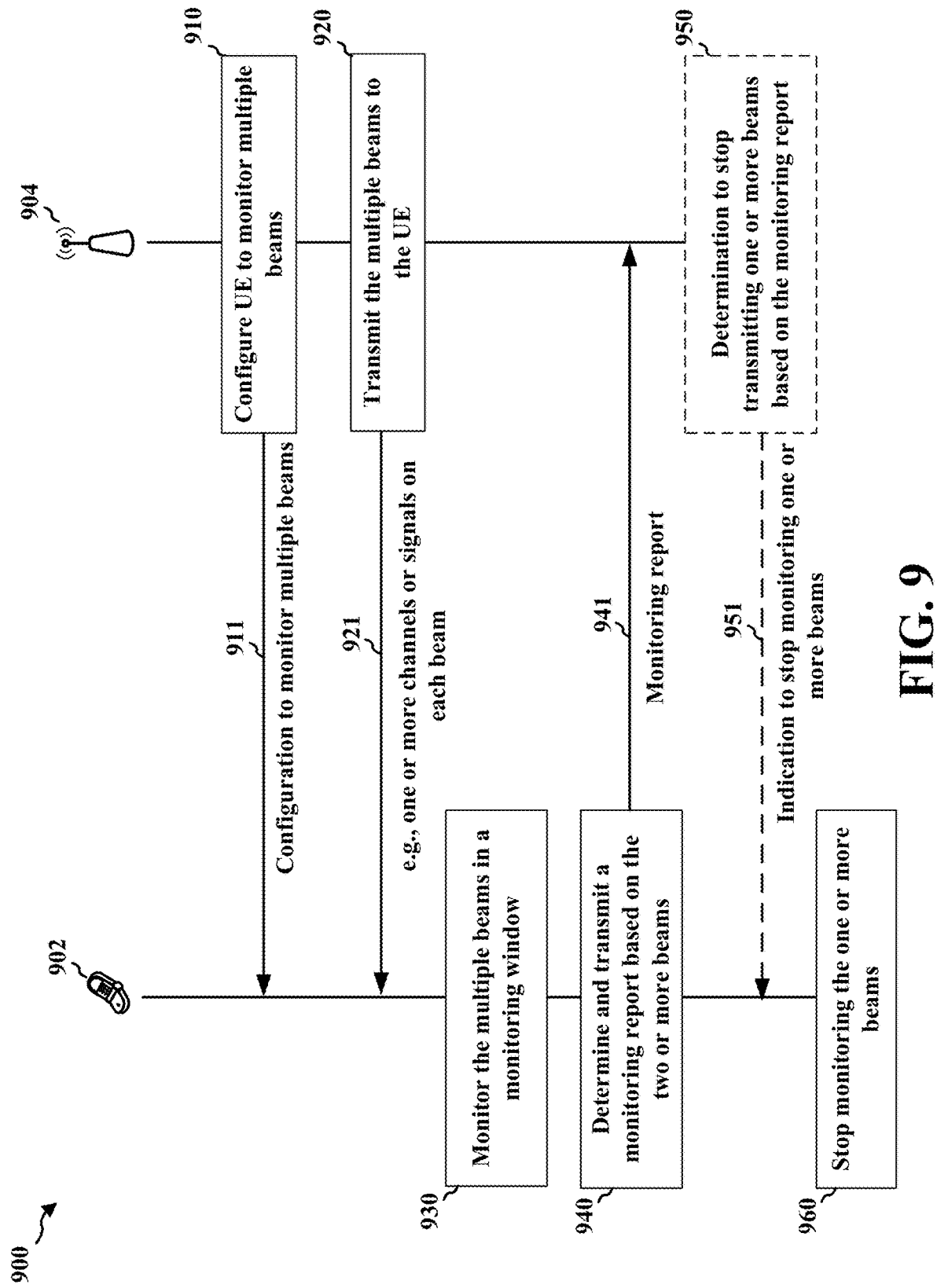
FIG. 9 is a diagram illustrating transmissions between a base station and a UE including multiple beams.

FIG. 9 is a diagram 900 illustrating transmissions between base station 904 and UE 902 that may include beamformed communication including multiple beams. For instance, base station 904 can configure 910 UE 902 to monitor multiple beams, e.g., as described in connection with FIG. 1 and FIG. 4. Base station 904 can transmit, and UE 902 can receive, this configuration 911. Next, base station 904 can transmit a signal or channel 920 to the UE 902 using the multiple beams. These multiple beams can include one or more channels or signals on each beam, as shown in 921. The signal may comprise SRS or DM-RS, for example. The channel may comprise PDSCH or PDCCH, for example. UE 902 can then monitor 930 the multiple beams in a monitoring window. The UE may monitor for control or data. The UE may monitor, e.g., a CORESET, for a control channel transmission. Also, UE 902 can determine 940 a monitoring report based on the two or more beams. As mentioned previously, this monitoring report can be based on a number of different factors, such as beam quality. UE 902 can also transmit the monitoring report to the base station 904, as shown in 941. Base station 904 can determine at 950 to stop transmitting using one or more beams based on the monitoring report from the UE. Base station 904 can then indicate 951 to the UE 902 that it will stop transmitting on at least one of the two or more beams based on the monitoring report. Next, base station 904 can refrain from transmitting the channel or signal to the UE on the at least one beam. The UE 902 can also refrain 960 from monitoring at least one beam, e.g., based on the determine monitoring report or measurements associated with the multiple beams. In some aspects, the UE 902 can refrain from monitoring at least one beam when the monitoring report is transmitted to the base station 904 or at an end of a time window after transmitting the monitoring report to the base station 904.

In one aspect of the present disclosure, the base station may configure the UE to monitor multiple CORESETS of multiple beams. As stated previously, this monitoring can be done in a monitoring window. As further stated herein, each CORESET comprises a frequency or time location, which can be on a certain channel, such as the PDCCH. The CORESETs can be monitored for a certain period within each block, e.g. 10 ms for each block. Each slot can have two CORESETs, which amounts to each QCLed with a different Synchronization Signal (SS) beam. For example, CORESET 0 can be in Symbol 0, while CORESET 1 can be in Symbol 1. Also, the monitoring window can comprise a certain periodicity, e.g. 256 ms.

In another aspect, if the base station has data to transmit, it can send the PDCCH in both of the CORESETS in a first slot and request a report from the UE. Accordingly, the base station can request an accelerated monitoring reporting. The UE can measure the PDCCH DMRS, or other sub-channels, as well as other metrics and provide feedback via the PUCCH. The UE can then determine which beam set is preferable to continue communication between the UE and the base station. Based on this, the UE can send the monitoring report back to the base station.

In one aspect, the UE can send a monitoring report to the base station including the information for which beam is preferable to continue communication. In another aspect, the UE can report to the base station which beam is least preferable. As such, the base station can select the other beam to continue communication. In this manner, the UE can instruct the base station on which beam to select in a number of different ways. In essence, the aforementioned beam monitoring can select the most suitable beam on which different channels, signals, or CORESETs are sent.

Alternatively, the UE may report the preferred or most suitable beam using the uplink. For instance, the report may be based on some CSI-RS/SSB in the first slot in an uplink resource, such as a PUCCH, scheduling request (SR), and/or random access channel (RACH). For example, the report may indicate the beam associated with a specific CORESET, e.g. CORESET 0, as the preferred beam. Then, the base station can send a confirmation for this report. In another aspect, the base station may not send a confirmation and avoid transmitting in a specific CORESET, e.g. CORESET 1. In a further aspect, the base station may disable search space associated with CORESET 1. After this, the UE can stop monitoring CORESET 1, or the search space associated with CORESET 1, for the rest of the monitoring window.

Figure 10:
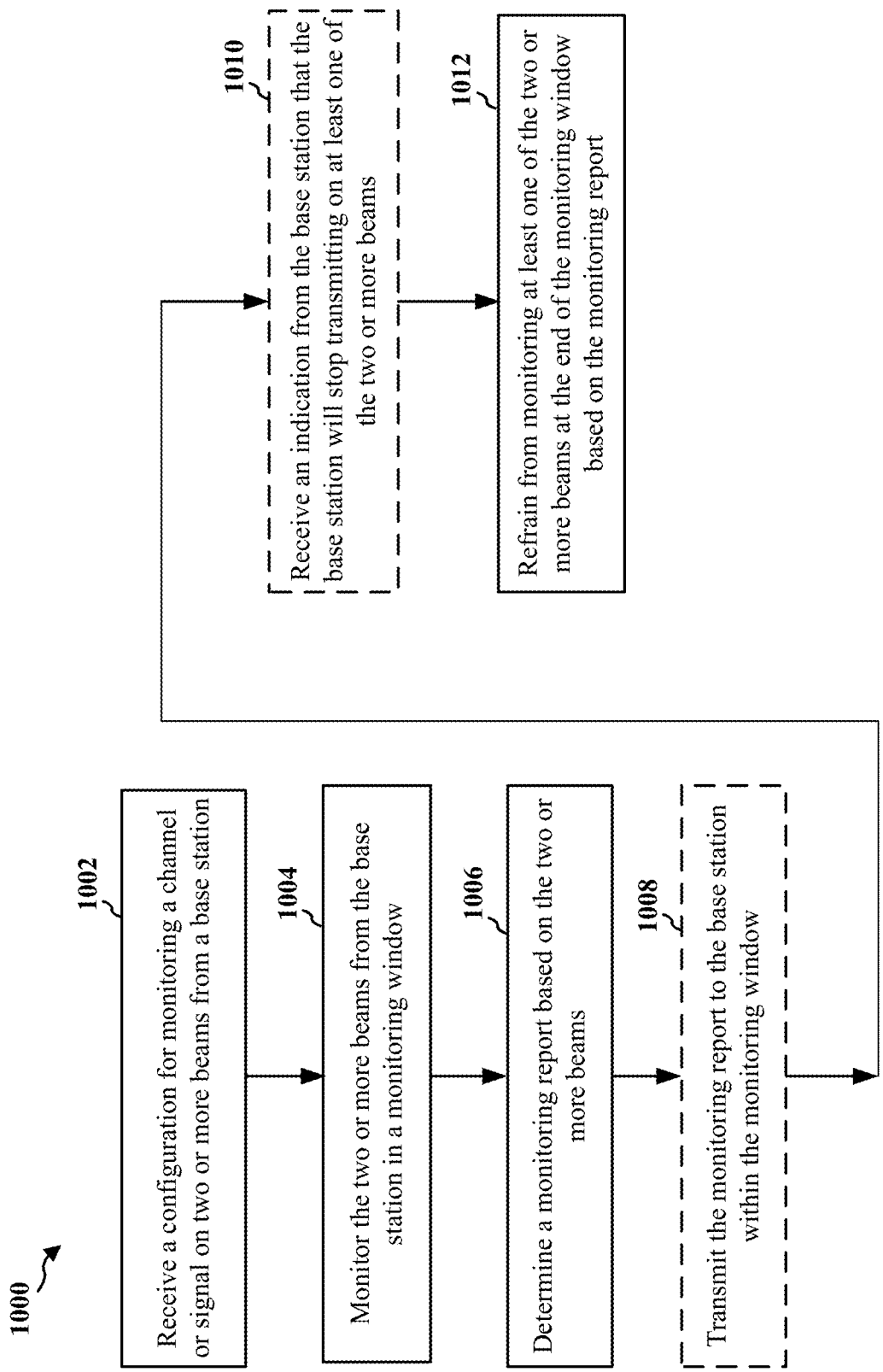
FIG. 10 is a flowchart of a method of wireless communication.

FIG. 10 is a flowchart 1000 of a method of wireless communication. The method may be performed by a UE (e.g., UE 104, 182, 350, 404, 902, the apparatus 1102/1102'; the processing system 1214, which may include the memory 360 and which may be the entire UE 350 or a component of the UE 350, such as the TX processor 368, the RX processor 356, and/or the controller processor 359). The UE may communicate with a base station (e.g., base station 102, 180, 310, 402, 904, apparatus 1402). Optional aspects are illustrated with a dashed line. The methods described herein can provide a number of benefits, such as improving power savings and resource utilization.

At 1002, the UE can receive a configuration for monitoring a channel or signal on two or more beams from a base station. The channel or signal can comprise a CORESET. At 1004, the UE can monitor the two or more beams within a monitoring window. The channel or signal can be received on the two or more beams at different time periods in the monitoring window. Additionally, the channel or signal can be received on the two or more beams at different frequency periods in the monitoring window. In some aspects, the UE can monitor each of the multiple beams for one or more channels or signals based on the CORESET configuration. In other aspects, multiple, different CORESETs can be configured for each of the two or more beams. Further, the configuration for the two or more beams can comprise a search space configuration providing time-domain or frequency-domain monitoring for the CORESETs. In some aspects, the channel or signal can be a control channel. In other aspects, the channel or signal can be a data channel. In yet other aspects, the channel or signal can be a demodulation reference signal (DMRS) associated with a control channel or a data channel.

At 1006, the UE can also determine a monitoring report based on the two or more beams. The monitoring report can indicate a subset of the multiple beams as being more suitable for communication between the UE and base station. In other aspects, the monitoring report can indicate a subset of multiple beams that are less suitable for communication between the UE and base station. In yet other aspects, the monitoring report may indicate one or more beams are more or less suitable for communication. Moreover, the monitoring report can be based on the reception quality of the two or more beams. At 1008, the UE can then transmit the monitoring report to the base station within the monitoring window. In other aspects, the UE can transmit the monitoring report outside the monitoring window.

At 1010, the UE can receive an indication from the base station that the base station will stop transmitting on at least one of the two or more beams. This indication can be in response to the monitoring report. This indication can be transmitted from the base station to the UE via direct signaling comprising at least one of downlink control information, radio resource control signaling, and/or a control element. In some aspects, after the UE sends the monitoring report, the base station can stop transmitting one or more beams based on the content of the report. In other aspects, after the UE sends the monitoring report, the base station continue transmitting the multiple beams. And in other aspects, if the UE does not send the monitoring report, the base station can continue to transmit the multiple beams.

Finally, at 1012, the UE can refrain from monitoring at least one of the two or more beams at the end of the monitoring window, which can depend on the subject matter of the monitoring report. The UE can also refrain from monitoring at least one of the beams outside of the monitoring window. In some aspects, the UE can refrain from monitoring at least one of the two or more beams when the monitoring report is transmitted to the base station or at an end of a time window after transmitting the monitoring report to the base station.

Figure 11:
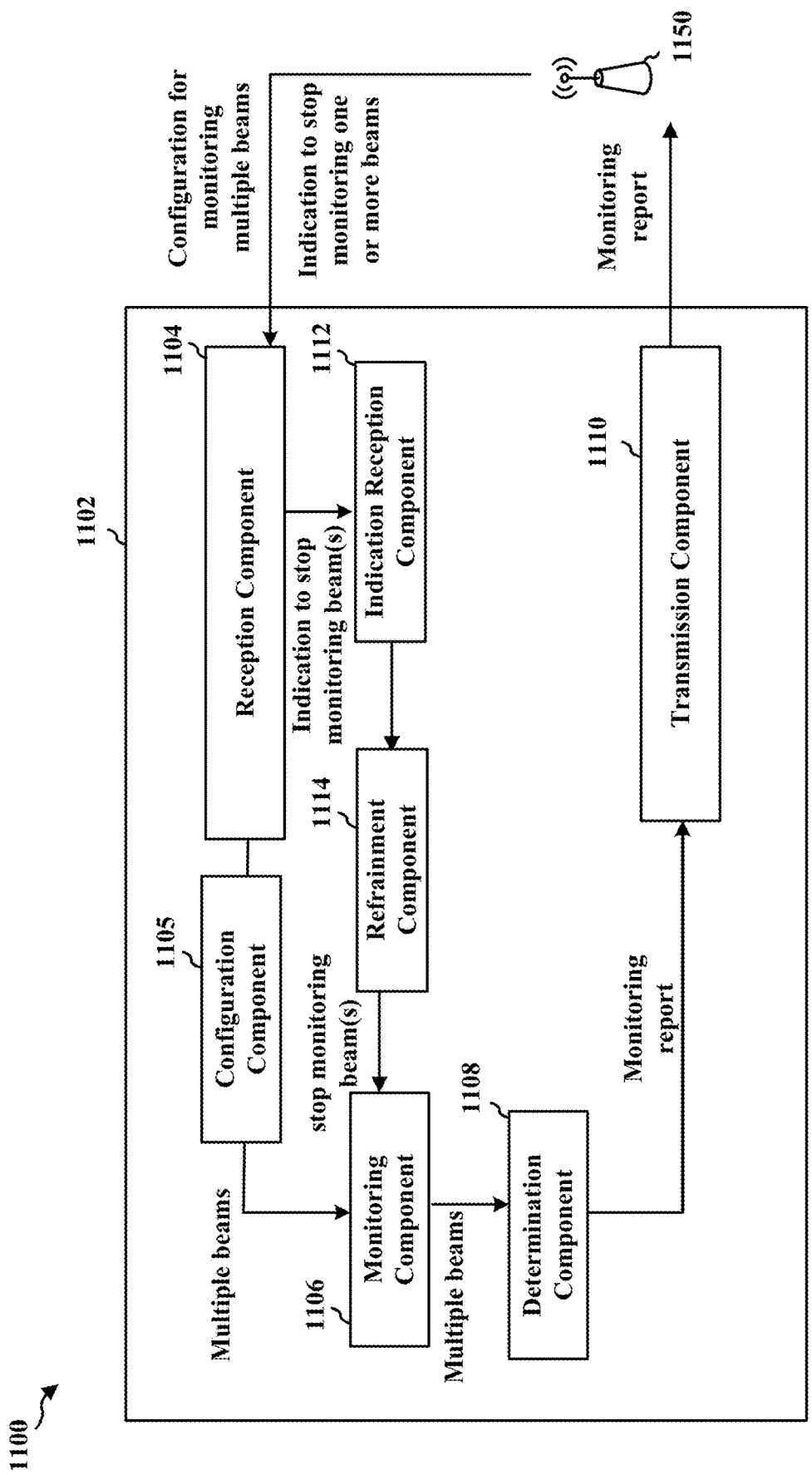
FIG. 11 is a conceptual data flow diagram illustrating the data flow between different means/components in an example apparatus.

FIG. 11 is a conceptual data flow diagram 1100 illustrating the data flow between different means/components in an exemplary apparatus 1102. The apparatus may be a UE (e.g., UE 104, 182, 350, 404, 902). The apparatus 1102 includes a reception component 1104 that receives downlink communication from the base station 1150 and a configuration component 1105 that receives a configuration for monitoring a channel or signal on two or more beams from the base station 1150. The apparatus also includes a monitoring component 1106 configured to monitor the two or more beams from the base station in a monitoring window, wherein the channel or signal is received on the two or more beams at different time periods in the monitoring window. A determination component 1108 can also determine a monitoring report based on the two or more beams. The apparatus 1102 can also comprise a transmission component 1110 configured to transmit the monitoring report to the base station within the monitoring window.

In addition, the apparatus 1102 can comprise an indication reception component 1112 configured to receiving an indication from the base station 1150 that it will stop transmitting on at least one of the two or more beams in response to the monitoring report. The apparatus 1102 can also comprise a refrainment component 1114 configured to refrain from monitoring at least one of the two or more beams at the end of the monitoring window based on the monitoring report.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
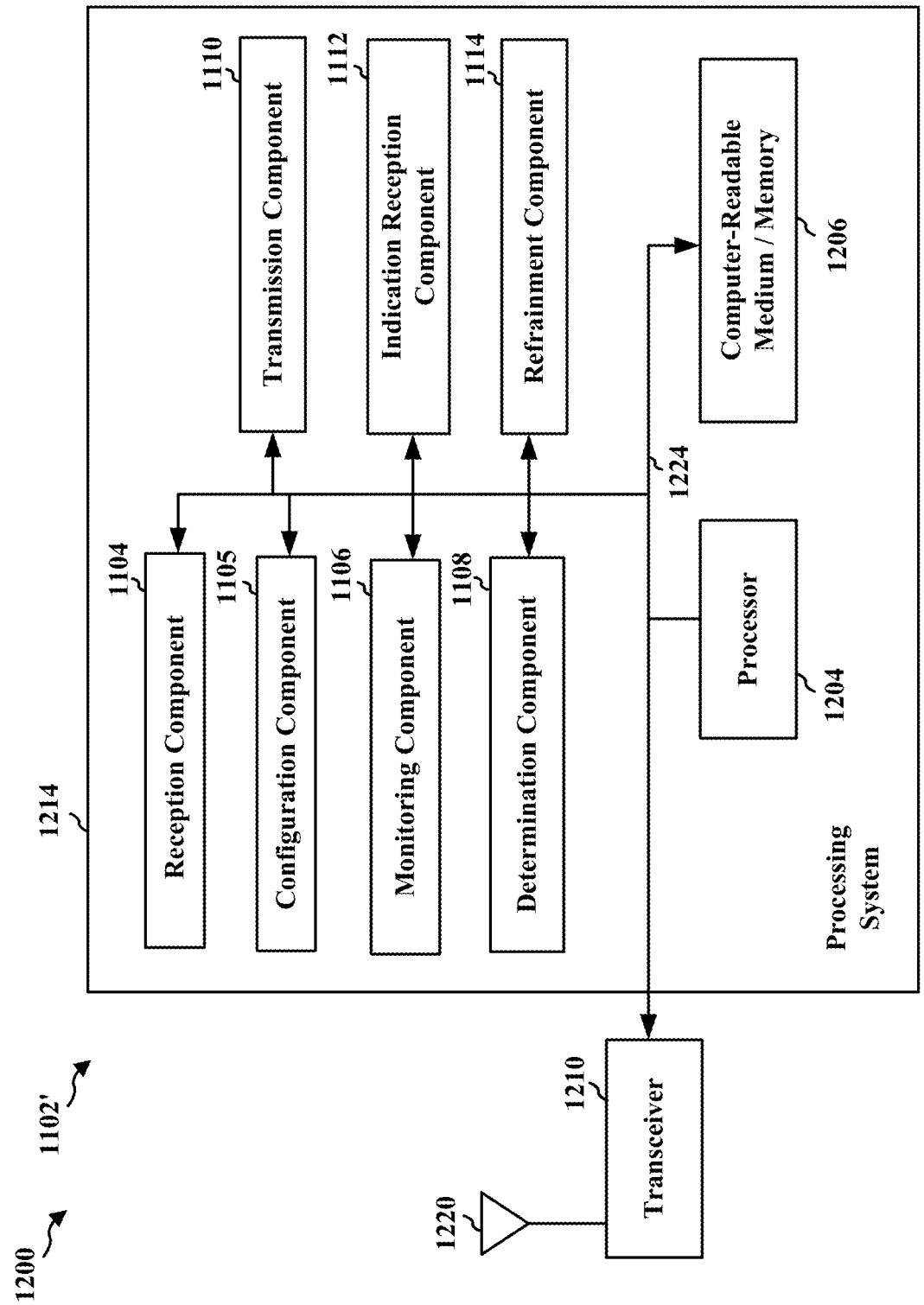
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1105, 1106, 1108, 1110, 1112, 1114, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the configuration reception component 1104 and the indication reception component 1112. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1105, 1106, 1108, 1110, 1112, and 1114. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 in FIG. 3).

In one configuration, the apparatus 1102/1102' for wireless communication includes means for receiving a configuration for monitoring a channel or signal on two or more beams from a base station; means for monitoring the two or more beams from the base station in a monitoring window, wherein the channel or signal is received on the two or more beams at different time periods in the monitoring window. The apparatus may include means for determining a monitoring report based on the two or more beams. The apparatus may include means for transmitting the monitoring report to the base station within the monitoring window. The apparatus may include means for refraining from monitoring at least one of the two or more beams at the end of the monitoring window based on the monitoring report. The apparatus may include means for receiving an indication from the base station that the base station will stop transmitting on at least one of the two or more beams in response to the monitoring report. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
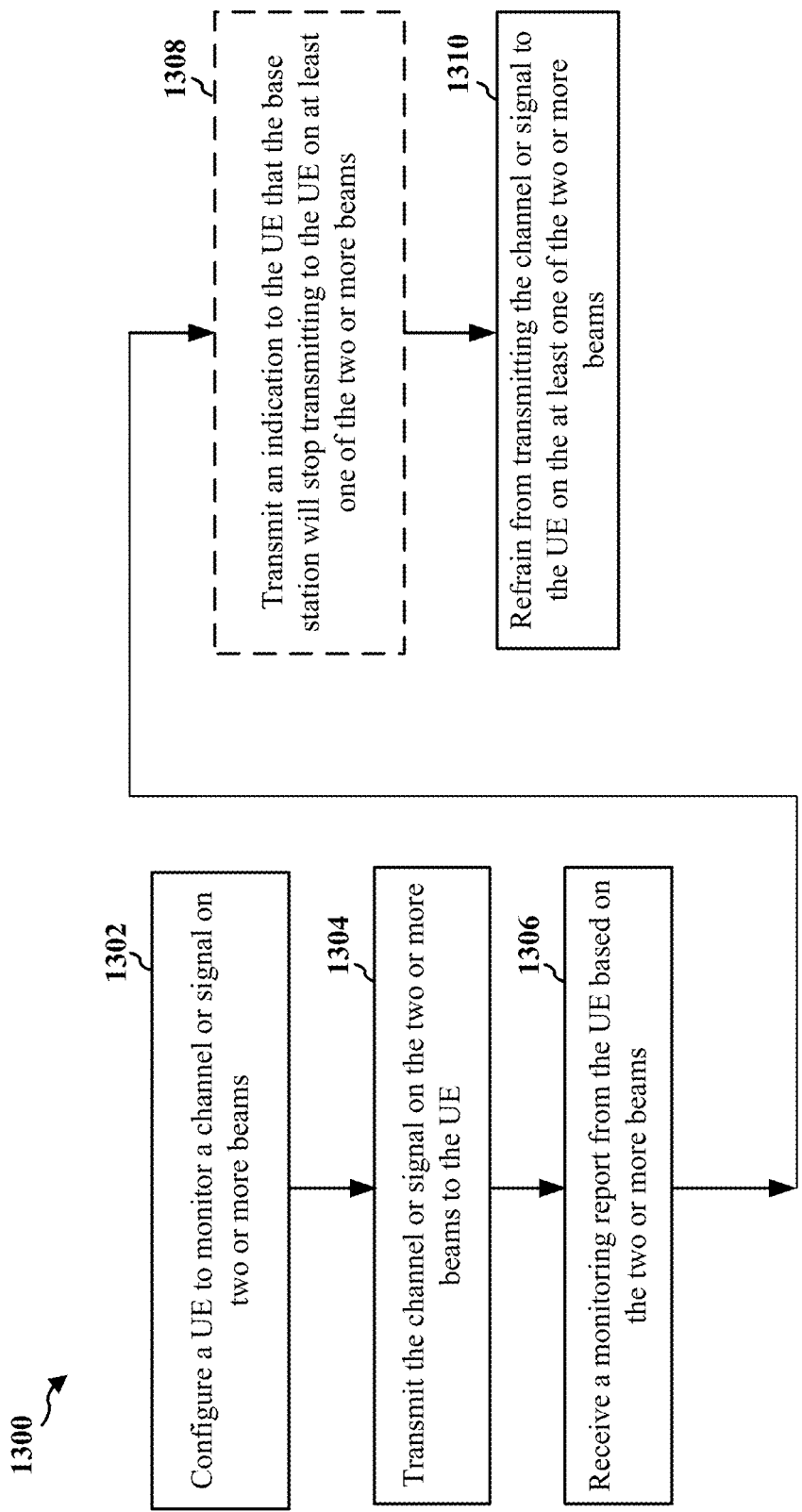
FIG. 13 is a flowchart of a method of wireless communication.

FIG. 13 is a flowchart 1300 of a method of wireless communication. The method may be performed by a base station (e.g., base station 102, 180, 310, 402, 904, apparatus 1402/1402'; the processing system 1514, which may include the memory 376 and which may be the entire base station or a component of the base station 310, such as the TX processor 316, the RX processor 370, and/or the controller/processor 375). The base station may communicate with a UE (e.g., UE 104, 182, 350, 404, 902, the apparatus 1102). Once again, optional aspects may be illustrated with a dashed line. The methods described herein can provide a number of benefits, such as improving power savings and resource utilization.

At 1302, the base station can configure a UE to monitor a channel or signal on two or more beams. As indicated previously, the channel or signal can comprise a CORESET. At 1304, the base station can transmit the channel or signal on the two or more beams to a UE. The channel or signal can be transmitted on the two or more beams at different time periods in the monitoring window. The channel or signal can also be transmitted on the two or more beams at different frequency periods in the monitoring window. Additionally, the UE can monitor each of the multiple beams from the base station based on the CORESET configuration. Moreover, different CORESETs can be configured for each of the two or more beams. The configuration for the CORESET can comprise a search space configuration providing time-domain or frequency-domain monitoring for one or more CORESETs. In some aspects, the channel or signal can be a control channel. In other aspects, the channel or signal can be a data channel. In yet other aspects, the channel or signal can be a demodulation reference signal (DMRS) associated with a control channel or a data channel.

At 1306, the base station can receiving a monitoring report from the UE based on the two or more beams. The monitoring report can indicate a subset of the multiple beams as being more suitable for communication between the UE and base station. Also, in some aspects, the monitoring report can indicate a subset of multiple beams that are less suitable for communication between the UE and base station. And in other aspects, the monitoring report may indicate one or more beams that are more or less suitable for communication. The monitoring report can be based on the reception quality of the two or more beams. The monitoring report can be received from the UE within the monitoring window, as well as outside the monitoring window.

At 1308, the base station can transmit an indication to the UE that it will stop transmitting to the UE on at least one of the two or more beams. This indication can be in response to the monitoring report. The indication can also be transmitted from the base station to the UE via direct signaling comprising at least one of downlink control information, radio resource control signaling, and/or a control element. At 1302, after the UE sends the monitoring report, the base station can refrain from transmitting the channel or signal to the UE on the at least one of the two or more beams based on the monitoring report received from the UE. In some aspects, after the UE sends the monitoring report, the base station continue transmitting the multiple beams. And in other aspects, if the UE does not send the monitoring report, the base station can continue to transmit each of the two or more beams.

The base station may use the resources previously used to transmit the signal on the beam(s) to transmit data.

In addition, based on the refrainment of transmitting one or more beams, the UE can stop monitoring at least one of the two or more beams at the end of the monitoring window. The UE can also refrain from monitoring at least one of the beams outside of the monitoring window.

Figure 14:
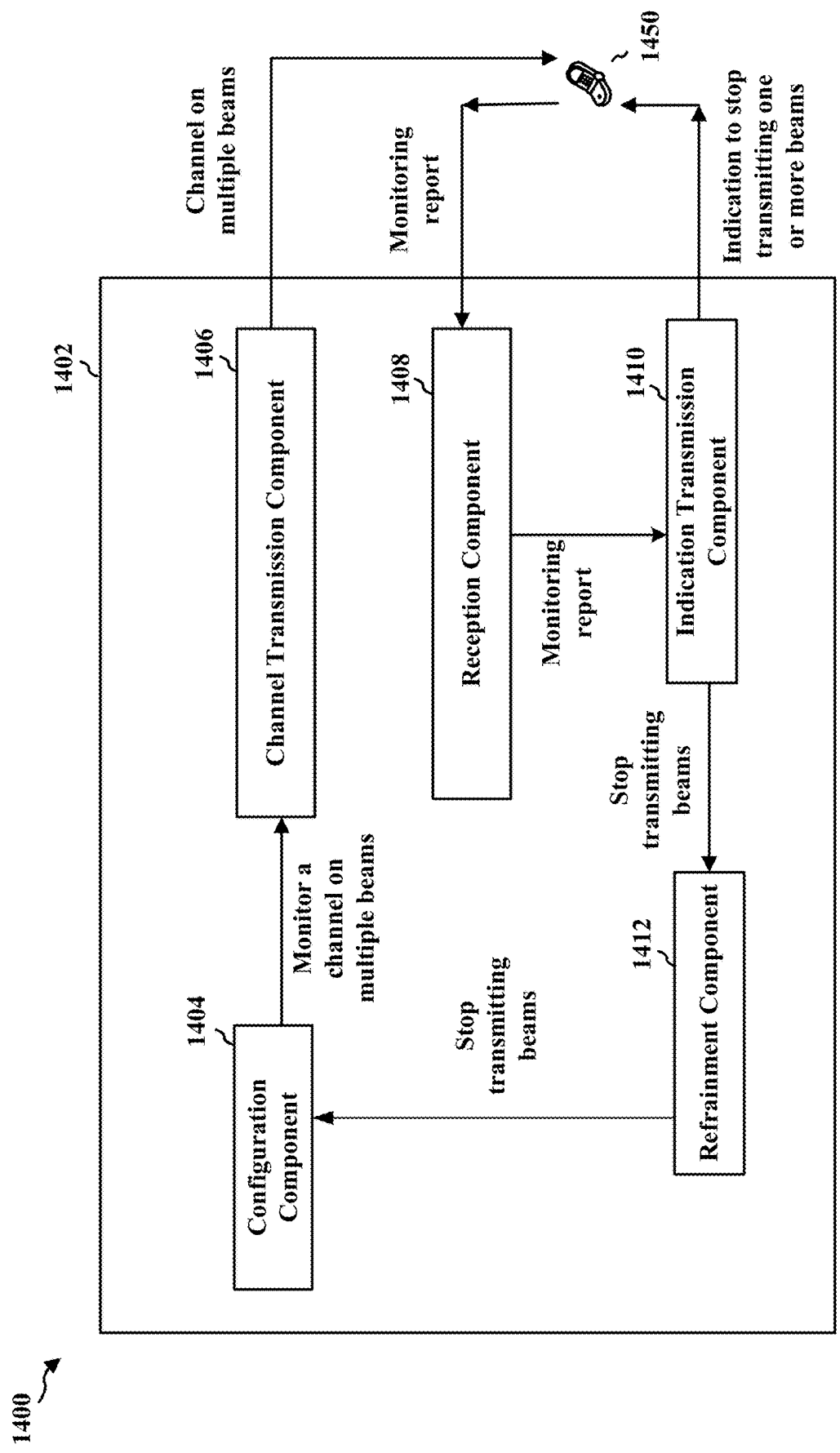
FIG. 14 is a conceptual data flow diagram illustrating the data flow between different means/components in an example apparatus.

FIG. 14 is a conceptual data flow diagram 1400 illustrating the data flow between different modules/means/components in an exemplary apparatus 1402. The apparatus may be a base station (e.g., base station 102, 180, 310, 402, 904). The apparatus 1402 includes a configuration component 1404 that can configure a UE to monitor a channel or signal on two or more beams. The apparatus can also include channel transmission component 1406 configured to transmit the channel or signal on the two or more beams to the UE, wherein the channel or signal is transmitted on the two or more beams at different time periods in a monitoring window.

The apparatus can further include reception component 1408 configured to receive a monitoring report from the UE based on the two or more beams. An indication transmission component 1410 can be configured to transmit an indication to the UE that the base station will stop transmitting to the UE on at least one of the two or more beams. Also, a refrainment component 1412 can be configured to refrain from transmitting the channel or signal to the UE on the at least one of the two or more beams based on the monitoring report received from the UE The apparatus may include additional components that perform each of the blocks of the algorithm in the aforementioned flowcharts of FIGS. 9 and 13. As such, each block in the aforementioned flowcharts of FIGS. 9 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
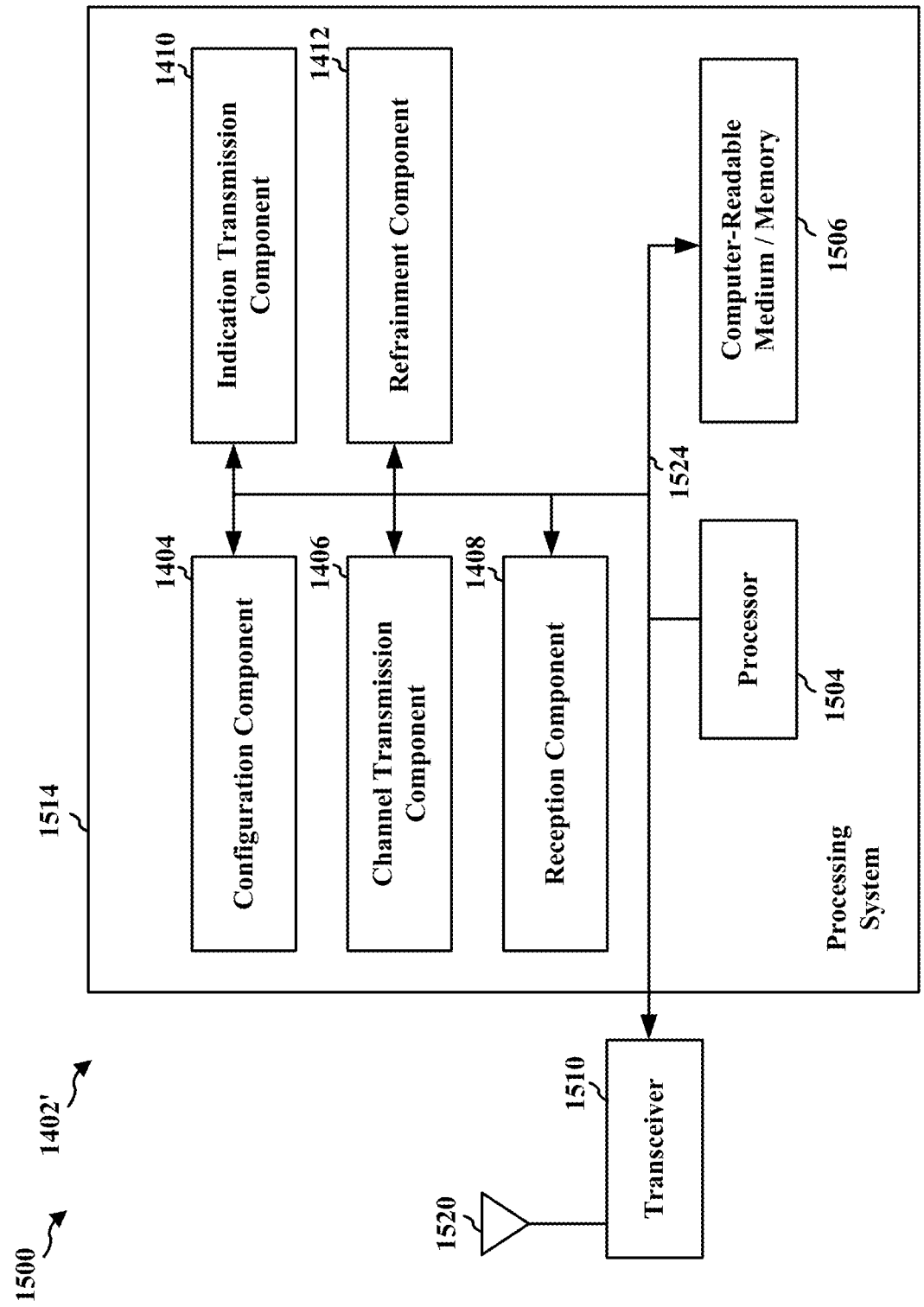
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1408. In addition, the transceiver 1510 receives information from the processing system 1514, specifically the channel transmission component 1406 and the indication transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, and 1412. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for configuring a user equipment (UE) to monitor a channel or signal on two or more beams. The apparatus may include means for transmitting the channel or signal on the two or more beams to the UE, wherein the channel or signal is transmitted on the two or more beams at different time periods in a monitoring window. The apparatus may include means for receiving a monitoring report from the UE based on the two or more beams. The apparatus may include means for transmitting an indication to the UE that the base station will stop transmitting to the UE on at least one of the two or more beams. The apparatus may include means for refraining from transmitting the channel or signal to the UE on the at least one of the two or more beams based on the monitoring report received from the UE. The apparatus may include means for transmitting data. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) for monitoring beams, comprising:
   receiving, from a network entity, a configuration for monitoring a channel or signal on each of a first control resource set (CORESET) of a first beam and a second CORESET of a second beam within a monitoring window;
   monitoring the first beam and the second beam from the network entity within the monitoring window, wherein the first beam and the second beam are received via different frequencies within the monitoring window;
   transmitting, to the network entity, a monitoring report within the monitoring window based on the first beam and the second beam, the monitoring report comprising information configured to cause the network entity to: (i) continue to use the first beam for communication between the UE and the network entity, and (ii) drop the second beam; and
   refraining from monitoring the second CORESET of the second beam until an end of the monitoring window and continuing to monitor for a signal on the first CORESET of the first beam based on the monitoring report.

2. The method of claim 1, wherein the refraining from monitoring comprises:
   refraining from monitoring the second CORESET of the second beam when the monitoring report is transmitted to the network entity or at an end of a time window after transmitting the monitoring report to the network entity.

3. The method of claim 1, wherein the channel or signal is a control channel.

4. The method of claim 1, wherein the channel or signal is a data channel.

5. The method of claim 1, wherein the channel or signal is a demodulation reference signal (DMRS) associated with a control channel or a data channel.

6. The method of claim 1, further comprising receiving, from the network entity, within the monitoring window and after transmitting the monitoring report, an indication that the network entity intends to stop transmitting on the second beam.

7. The method of claim 1, wherein the monitoring report is based on a reception quality of the first beam and the second beam.

8. The method of claim 1, further comprising receiving, from the network entity via direct signaling, within the monitoring window, an indication comprising at least one of downlink control information, radio resource control signaling, or a control element.

9. The method of claim 1, further comprising receiving, from the network entity, within the monitoring window, an indication that the network entity is disabling a search space associated with the second beam for at least a remainder of the monitoring window after receiving the indication based on the monitoring report.

10. The method of claim 1, wherein the monitoring window is a first monitoring window, and wherein the method further comprises: resume monitoring the first beam and the second beam from the network entity within a second monitoring window occurring after the first monitoring window.

11. The method of claim 1, wherein the monitoring window is periodic.

12. An apparatus for wireless communication at a User Equipment (UE), comprising:
   a memory; and
   at least one processor coupled to the memory and configured to:
      receive, from a network entity, a configuration for monitoring a channel or signal each of a first control resource set (CORESET) of a first beam and a second CORESET of a second beam within a monitoring window;
      monitor the first beam and the second beam from the network entity within the monitoring window, wherein the first beam and the second beam are received via different frequencies within the monitoring window;
      transmit, to the network entity, a monitoring report within the monitoring window based on the first beam and the second beam, the monitoring report comprising information configured to cause the network entity to: (i) continue to use the first beam for communication between the UE and the network entity, and (ii) drop the second beam; and
      refrain from monitoring the second CORESET of the second beam until an end of the monitoring window and continue to monitor for a signal on the first CORESET of the first beam based on the monitoring report.

* * * * *